July 17, 1928.
J. W. SNEDEKER
TOY WOODPECKER
Filed July 20, 1926
1,677,463
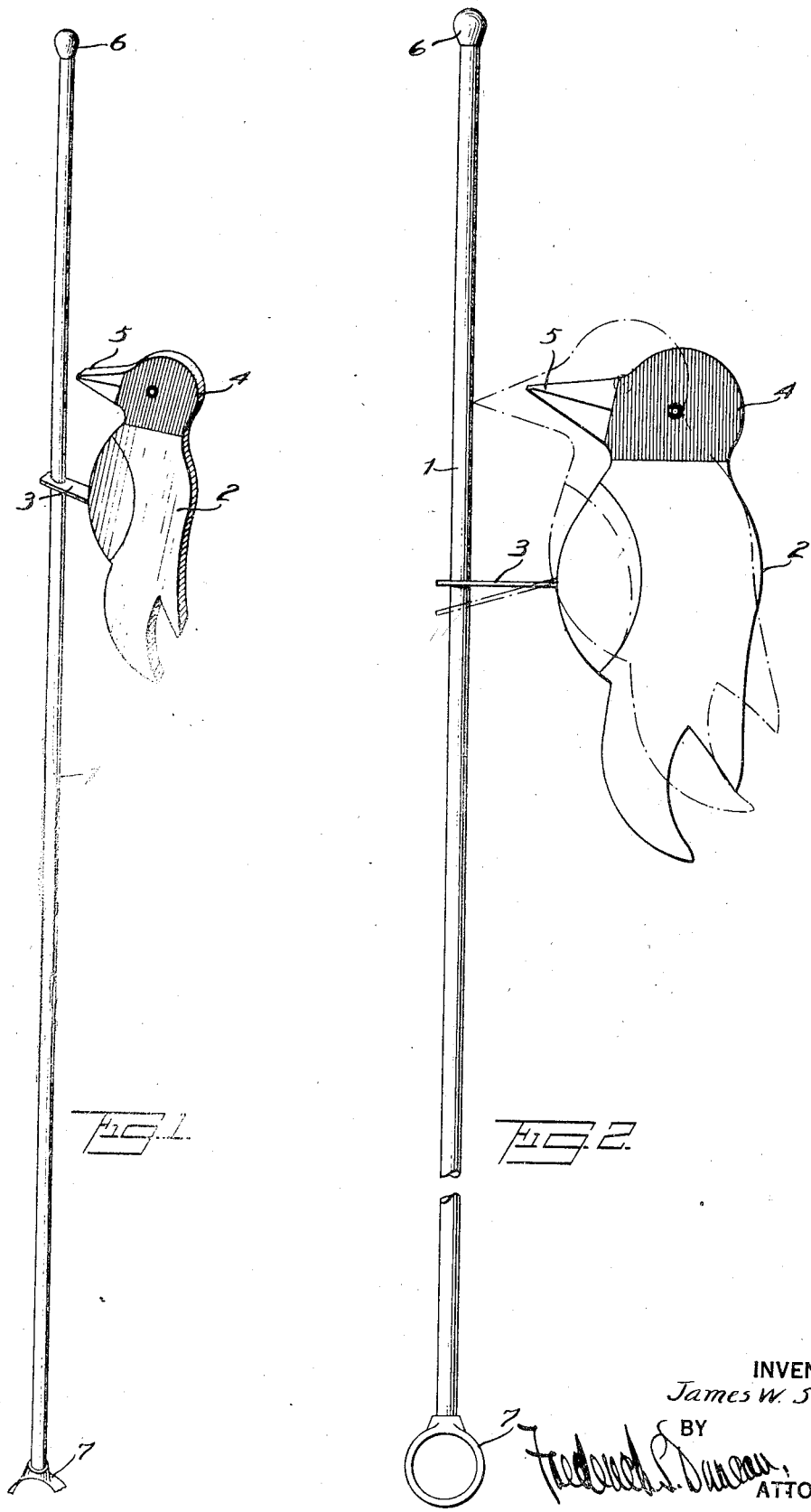

Patented July 17, 1928.

1,677,463

UNITED STATES PATENT OFFICE.

JAMES W. SNEDEKER, OF ADRIAN, MICHIGAN, ASSIGNOR TO PAGE STEEL & WIRE COMPANY, A CORPORATION OF NEW JERSEY.

TOY WOODPECKER.

Application filed July 20, 1926. Serial No. 123,606.

This invention relates to toys, and has for its object a toy comprising a supporting rod and a member adapted to take the form of a bird or the like, preferably a woodpecker, which is supported from the rod by a connecting device which is adapted to oscillate under the action of gravity, allowing the supported woodpecker or other bird to descend in a series of jerky movements which simulate the action of a woodpecker in pecking at a tree.

These and other objects of the invention are set forth and illustrated in the accompanying specification and drawings and are pointed out in the claims.

In the drawings,

Fig. 1 is a view in perspective of a toy in the construction of which my invention has been embodied.

Fig. 2 is a view in side elevation on a larger scale.

In the illustrated embodiment, the part designated by the reference numeral 1 is a rod, preferably having considerable rigidity, as for example a curtain rod of strong tubing or a solid metal rod of any suitable cross section, preferably circular.

In pursuance of the invention, I provide a member 2 supported by a connecting member 3 which is adapted to be connected with the rod 1, and to move lengthwise thereupon. For this purpose, the member 3 may conveniently be formed of a thin flat piece of spring steel, having near one end a hole slightly larger than the rod, the other end being embedded in the material of the member 2. In the instance illustrated the member 2 takes the form of a bird, preferably a woodpecker, having a red head 4 with a beak 5 of a length suitable to tap against the rod 1, as illustrated by dotted lines in Fig. 2, the connector member 3 extending preferably from approximately the mid-portion of the body, so that the bird will oscillate toward and from the rod as the bird travels downward by gravity either when the rod is in the position shown in the drawings, or when the whole device is inverted, bringing the head of the woodpecker downward.

In either position of the device the weight of the bird causes the bird to descend, and the spring 3 alternately binds the rod 1 and slips thereon, so that the vibration of the spring causes the bird to rock backward and forward as it travels down the rod, giving a lifelike representation of a woodpecker traveling down a tree and pecking at the same time.

The figure of the bird may be sawed out of a thin piece of wood and a thin slot sawed in the breast of the bird to receive the spring 3, the latter constituting an imitation of the feet of the bird. Owing to the fact that the hole in the connector member is slightly larger than the rod, as above described, the tendency of the bird is to swing to one side or the other laterally, inasmuch as the body is supported at about its mid-portion so that there will be a tendency of the bird to wobble sideways as well as to vibrate up and down, and this will tend to cause the bird to travel around the rod, when the latter is of circular cross section.

This causes the bird to exhibit a life like representation of a bird running around a tree, as is characteristic of the action of a woodpecker.

The rod is preferably provided at each end with a small ball, as shown at 6 or a ring as shown at 7 for convenience in holding the same and to avoid danger of injury to a child in operating the toy.

I claim:

1. A toy comprising a rod, and a member simulating a bird, having a body with a head provided with a beak directed toward the rod, and a connector extending from the body in a position corresponding to the feet of the bird and mounted slidably upon said rod and adapted to support said body closely adjacent to the rod, and so that the beak oscillates toward and away from said rod, as said connector moves lengthwise along said rod, simulating the action of a bird pecking at a tree.

2. A toy as in claim 1, in which the foot of the bird is formed by a member having a single flat apertured portion traversed by the rod, said connector extending from the midportion of the body, so that the bird is adapted to travel occillatingly in either direction along said rod under the action of gravity induced by reversal of the position of said rod, the bird being so balanced that the flat connector portion tends to cause the bird to circle about said rod as it travels, whereby the bird exhibits the effect of running around a tree.

In testimony whereof, I have signed this specification.

JAMES W. SNEDEKER.